(12) United States Patent
Yokota

(10) Patent No.: US 7,363,146 B2
(45) Date of Patent: Apr. 22, 2008

(54) CAR NAVIGATION SYSTEM AND PROGRAM

(75) Inventor: Yasunari Yokota, Kariya (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 11/153,376

(22) Filed: Jun. 16, 2005

(65) Prior Publication Data

US 2005/0288851 A1    Dec. 29, 2005

(30) Foreign Application Priority Data

Jun. 29, 2004    (JP)    ............... 2004-191789

(51) Int. Cl.
*G01C 21/00*    (2006.01)
(52) U.S. Cl. ..................... 701/200; 340/990
(58) Field of Classification Search ............... 701/200, 701/207, 208, 210, 211; 340/990, 995.1, 340/995.14, 995.18
See application file for complete search history.

(56) References Cited

U.S. PATENT DOCUMENTS

| | | | |
|---|---|---|---|
| 5,157,614 A * | 10/1992 | Kashiwazaki et al. ...... | 701/200 |
| 5,944,768 A * | 8/1999 | Ito et al. .................... | 701/200 |
| 6,088,652 A * | 7/2000 | Abe .......................... | 701/208 |
| 6,205,399 B1 * | 3/2001 | Ogino et al. ................ | 701/213 |
| 6,674,414 B2 | 1/2004 | Saitou et al. | |
| 6,704,647 B1 * | 3/2004 | Monde et al. .............. | 701/208 |
| 6,725,258 B1 * | 4/2004 | Bick et al. .................. | 709/219 |
| 6,882,933 B2 * | 4/2005 | Kondou et al. ............. | 701/203 |
| 7,167,640 B2 * | 1/2007 | Gadre et al. ................ | 386/125 |

FOREIGN PATENT DOCUMENTS

| | | |
|---|---|---|
| JP | A-10-232136 | 9/1998 |
| JP | A-2002-196051 | 7/2002 |
| JP | A-2002-296049 | 10/2002 |
| JP | A-2002-340582 | 11/2002 |
| JP | A-2002-340597 | 11/2002 |

* cited by examiner

*Primary Examiner*—Dalena Tran
(74) *Attorney, Agent, or Firm*—Posz Law Group, PLC

(57) ABSTRACT

When a corridor operation is conducted in a car navigation system, a stoppable place where a vehicle is able to stop is retrieved before a map disk is removed. The stoppable place is a place that is located along a route to a destination and also as close as possible to a regional boundary of map data clipped out from the map disk to an external memory. When the stoppable place is retrieved, route guiding is performed so that the retrieved stoppable place is regarded as a temporary destination. Therefore, re-setting the map disk can be safely achieved by stopping the vehicle at the stoppable place, which helps prevent usability of the corridor operation from deteriorating.

15 Claims, 6 Drawing Sheets

CAR NAVIGATION SYSTEM AND PROGRAM

CROSS REFERENCE TO RELATED APPLICATIONS

This application is based on and incorporates herein by reference Japanese Patent Application No. 2004-191789 filed on Jun. 29, 2004.

FIELD OF THE INVENTION

The present invention relates to a car navigation system.

BACKGROUND OF THE INVENTION

A car navigation system is one of in-vehicle systems that use disk-shaped storage media (hereinbelow referred to as a disk) that store data to perform given processes. This car navigation system functions as follows: a disk (hereinbelow referred to as a map disk) stores map data or the like; the map disk is set to a disk player; the map data or the like is read out from the map disk; and, thereby, maps displayed or routes are searched for. Furthermore, an AV (audio visual) system is another in-vehicle system using a disk. The AV system reads music data or video/sound data from a music CD or a video DVD (hereinafter referred to as an AV disk) to reproduce.

There is a case that a car navigation system and an AV system share only one disk player because of a physical setting space's limit or cost cutting, which poses a problem. Only switching disks for two purposes precludes a map disk from being continuously set. Map display or route guidance thereby becomes unpractical. Therefore, it is described that a given range of map data read out from a map disk is temporarily stored in a memory (refer to Patent Document 1). This enables such map display using the stored given range of map data even without the map disk being set in the disk player.

Patent Document 1: JP-2002-196051 A

However, temporarily storing a large range of map data is unpractical because of a memory volume limit. When a map display range or a route guidance range exceeds the stored given range of map data, the map display or the route guidance cannot continue. Consequently, re-setting the map disk in the disk player is required to read out necessary map data for the map display or the route guidance to continue.

For instance, a user needs to replace an AV disk with a map disk. When the user is a driver, it is unsafe that the driver changes the disks during driving. The driver therefore searches for a proper place to stop a vehicle. Finding the proper place is not always possible, which may causes the vehicle to exit from the stored given range of map data during searching for the place. Consequently, even a current position becomes not displayed. This significantly restricts serviceability or usability of sharing a disk player by temporarily storing a given range of map data from a map disk.

SUMMARY OF THE INVENTION

It is an object of the present invention to provide a navigation system to help prevent serviceability or usability of sharing a disk player by temporarily storing a given range of map data from a map disk in order to continue map display or the like.

To achieve the above object, a car navigation system in a vehicle is provided with the following. A disk reproducing unit is included for being able to read and reproduce data from one of a first disk storing map data and a second disk storing data other than the map data, wherein the first disk and the second disk are interchangeable in the disk reproducing unit. A storing unit is included for storing a given range of map data that is read out from the first disk via the disk reproducing unit. A controlling unit is included for causing a display unit to display a map based on map data read out from the first disk when the first disk is reproduced by the disk reproducing unit or based on the given range of map data stored in the storing unit when the second disk is reproduced by the disk reproducing unit. A current position designating unit is included for designating a current position of the vehicle. A route guiding unit is further included for indicating a route to a destination. Here, when the controlling unit causes the display unit to display a map based on the given range of map data, the controlling unit causes the route guiding unit to indicate a route to a temporary destination that is as close as possible to a peripheral boundary of the given range of map data along the route to the destination and is a stoppable place where the vehicle is able to stop.

Under this structure, in a state where a map disk as the first disk is set in the disk reproducing unit, a given range of map data is temporarily stored to the storing unit. Therefore, even after the map disk is removed or replaced with the second disk, e.g., a DVD video disk, from the disk reproducing unit, map display or route guiding can be conducted using the stored given range of map data. Further, before the vehicle crosses the peripheral boundary of the given range, route guiding to a stoppable place is conducted. The vehicle is thereby able to stop at the stoppable place for the map disk to be substituted for the second disk and re-set in the disk reproducing unit. This enables re-setting of the map disk to be safely conducted. Further, in a state where the map disk is set, map data is newly read out and used for subsequent route guiding or map display. Otherwise, route guiding or map display can be conducted using map data read out to the storing unit from the re-set map disk. This helps prevent deterioration of the usability of conducting a given process by reproducing the second disk while the route guiding or the map display continues.

Furthermore, in the above aspect of the present invention, setting a guiding route is one of the presuppositions, so the stoppable place that is as close as possible to the peripheral boundary of the given range of map data along the route to the destination can be designated. However, when guiding route is not set, the above method cannot be adopted. Therefore, as another aspect of the present invention, a car navigation system in a vehicle is differently provided with the following. A disk reproducing unit is included for being able to read and reproduce data from one of a first disk storing map data and a second disk storing data other than the map data, wherein the first disk and the second disk are interchangeable in the disk reproducing unit. A storing unit is included for storing a given range of map data that is read out from the first disk via the disk reproducing unit. A controlling unit is included for causing a display unit to display a map based on map data read out from the first disk when the first disk is reproduced by the disk reproducing unit or based on the given range of map data stored in the storing unit when the second disk is reproduced by the disk reproducing unit. A current position designating unit is included for designating a current position of the vehicle. A notifying unit is included for notifying a user. Here, in a case that the controlling unit causes the display unit to display a map based on the given range of map data stored in the storing unit, the controlling unit causes the notifying unit to notify a place where the vehicle is able to stop and that is located from the current position to a peripheral boundary of the given range of map data when the vehicle approaches the peripheral boundary within a given distance.

This notifying unit can adopt a method using a display, a method using a sound, or a method using both a display and a sound.

In yet another aspect of the present invention, a car navigation system in a vehicle is provided with the following. A disk reproducing unit is included for being able to read and reproduce data from one of a first disk storing map data and a second disk storing data other than the map data, wherein the first disk and the second disk are interchangeable in the disk reproducing unit. A storing unit is included for storing a given range of map data that is read out from the first disk via the disk reproducing unit. A controlling unit is included for causing a display unit to display a map based on map data read out from the first disk when the first disk is reproduced by the disk reproducing unit or based on the given range of map data stored in the storing unit when the second disk is reproduced by the disk reproducing unit. A current position designating unit is included for designating a current position of the vehicle. A stoppable place determining unit is further included for determining a stoppable place where the vehicle is able to stop and that is located from the current position to a peripheral boundary of the given range of map data in a case that the controlling unit causes the display unit to display a map based on the given range of map data stored in the storing unit, so that the first disk is able to be re-set in the disk reproducing unit at the stoppable place before the vehicle crosses the peripheral boundary of the given range.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A car navigation system of the present invention is directed to an embodiment which will be explained below using diagrams.

(Explanation of Car Navigation System)

Figure 1:
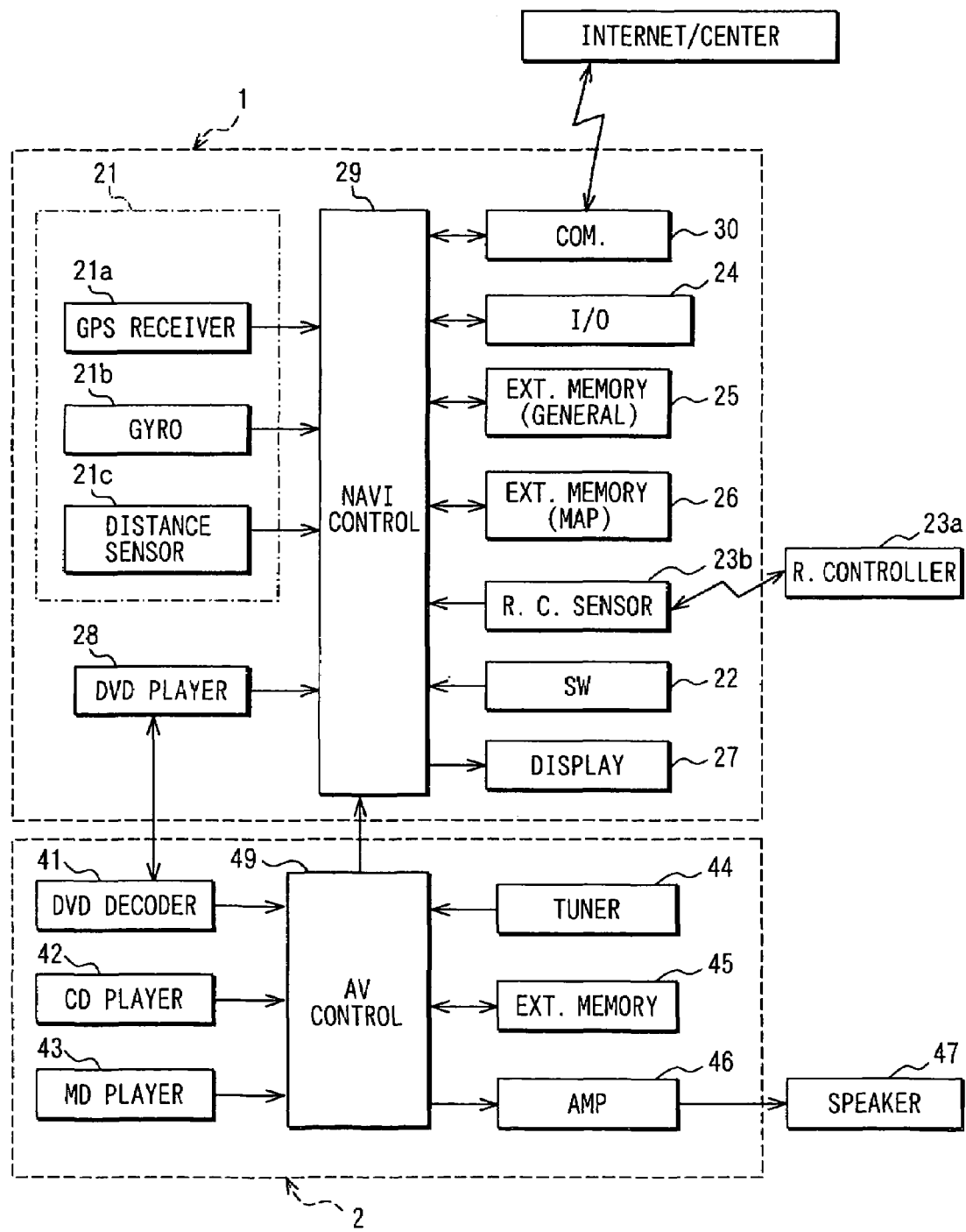
FIG. 1 is a block diagram showing a schematic structure of a car navigation system according to an embodiment of the present invention.

A car navigation system 1 according to the embodiment is shown regarding its structure in FIG. 1. This system 1 is mounted in a vehicle and connected with an AV system 2.

The system 1 includes: a position detector 21 for detecting a current position of the vehicle; an operation switch group 22 for accepting various instructions from a user; a remote controller 23a for accepting various instructions from a user like the operation switch (SW) group 22; a remote control sensor 23b for receiving signals from the remote controller 23a; an external information input and output (I/O) unit 24; an external memory 25 for general purpose for functioning as a memory for general data; an external memory 26 for map for functioning as a memory exclusive for map data; a display unit 27 for displaying map display windows, TV windows, or the like; a DVD player 28 for reproducing a map disk, a DVD video disk, or the like; a communications unit 30; and a control circuit 29 for controlling the overall system 1.

In contrast, the AV system 2 includes: a DVD video decoder 41, a CD player 42, an MD player 43, a tuner 44 for the radio and TV, an external memory 45, a power amplifier (AMP) 46 connected with a speaker 47, and an AV control circuit 49 for controlling the overall AV system 2.

In detail, the position detector 21 includes a GPS receiver 21a that receives radio waves from satellites for GPS (Global Positioning System) via a GPS antenna to detect a position of the vehicle, a gyroscope 21b that detects rotational movements applied to the vehicle, and a distance sensor 21c that detects a traveled distance of the vehicle. These sensors or the like 21a to 21c have individual types of errors, so that these sensors mutually compensate one another. Depending on a required accuracy, only part of the sensors 21a to 21c can be used; furthermore, a geomagnetic sensor, a rotational sensor for steering, or a wheel sensor for each following wheel can be included.

The operation switch group 22 is integrated into the display unit 27 and includes a touch panel or mechanical switches disposed in an outer periphery of the display unit 27. The touch panel and the display unit 27 are laminated into a unit. The touch panel can be any one of a pressure-sensitive type, an electromagnetic inductive type, an electrostatic capacity type, or any combination of the foregoing types.

The external information input and output unit 24 is for inputting information from various information collection devices or the like to input, e.g., FM broadcasting signals received via a radio antenna (not shown), radio wave beacon signals and optical beacon signals received from stationary stations for the VICS (Vehicle Information and Communication System) disposed in proximity to roads.

The DVD player 28 reproduces a map disk, a DVD video disk, or the like. In this embodiment, only one disk drive is included in the DVD player 28, so that a user manually changes disks to set a disk that is to be reproduced.

The map disk includes road data of network data, map data of so-called map matching for enhancing accuracy in designating positions, facility data of facilities, images or sound data for guidance, or the like.

The external memory 25 for general purposes is used for the navigation control circuit 29 to conduct various processes for computing guiding routes, leading to the routes, or generating control information for the AV system 2.

In contrast, the external memory 26 for map data exclusively store map data. As explained above, when the DVD player 28 reproduces the DVD video disk, the map disk is replaced with the DVD video disk. The DVD player 28 is only used for reproducing video while the DVD video disk is being reproduced. In this case, map data needs to be previously cached in order to continue map display, guiding route search, or route guidance. Therefore, a given range of map data is read out from the map disk and temporarily stored in the external memory 26 for map data.

The display unit 27 is a color display unit and is any one of a liquid crystal display, a plasma display, a CRT, or the like. The display unit 27 displays on its display screen additional data such as a current position mark representing a current position, a guiding route to a destination, names, landmarks, or marks representing facilities while they are overlapped with each other. Here, the current position mark is designated from the current position detected by the position detector 21 and the map data read out from the map disk or the external memory 26 for map data. Moreover, guidance for facilities is also displayed.

The communications unit 30 exchanges information with the Internet, an information center, or the like, or conducts data communications for streaming reproduction of compressed audio files by cooperating with a music distribution server in a network.

The navigation control circuit 29 mainly consists of a known micro-computer that includes an MPU, a ROM, a RAM, a DRAM, an I/O, and a bus line connecting the foregoing components. The circuit 29 conducts a map display process, a route guiding process, or the like. In the map display process, a current position is computed along with its coordinates and an advancing direction based on detection signals from the position detector 21; then, a map surrounding the current position read out from the map disk or the external memory 26 for map data is displayed or a map of a range designated by operating the operation switch group 22 or the remote controller 23a is displayed. In the route guiding process, a facility as a destination is selected via the operation switch group 22 or the remote controller 23a based on the map data stored in the map disk or the external memory 26 for map data; then, the route guiding process or route guidance is conducted by automatically computing an optimum guiding route from the current position to the destination. The method for automatically setting the optimum guiding route includes the known Dijkstra method.

Moreover, the navigation control circuit 29 connects with the AV control circuit 49 of the AV system 2, outputting various control requests to the AV control circuit 49. The control requests are conducted based on operating of the operation switch group 22, the remote controller 23a, or the like. The AV control circuit 49 that receives the various control requests conducts by using the external memory 45 the following processes: sound source switching, video source switching, random repeats, reproduction control such as fast-forward or fast-rewind, or pseudo-sound field control. Sound signals are obtained from the DVD video decoder 41, the CD player 42, the MD player 43, or the tuner 44 and outputted via the power amplifier 46 to the speaker 47. In contrast, video signals are obtained from the tuner 44 and image signals are obtained from the DVD video decoder 41. The video signals and the image signals are outputted via the navigation control circuit 29 to the display unit 27. When the DVD player 28 reproduces the DVD video, file data having an MPEG 2 format read out by the DVD player 28 is transferred to the DVD video decoder 41. The DVD video decoder 41 decodes the MPEG 2 format file data to reproduce the DVD video. Reproduced images are transferred via the AV control circuit 49 to the navigation control circuit 29 and then outputted in the display unit 27. In contrast, reproduced sounds are outputted via the power amplifier 46 to the speaker 47.

Furthermore, the car navigation system 1 includes another function of various sound guidance for guiding routes or facilities. In this sound guidance function, the navigation control circuit 29 outputs a control request to the AV control circuit 49, and the sound guidance is outputted via the power amplifier 46 to the speaker 47.

(Explanation of Map Data and Facility Data)

Map Data

Figure 2:
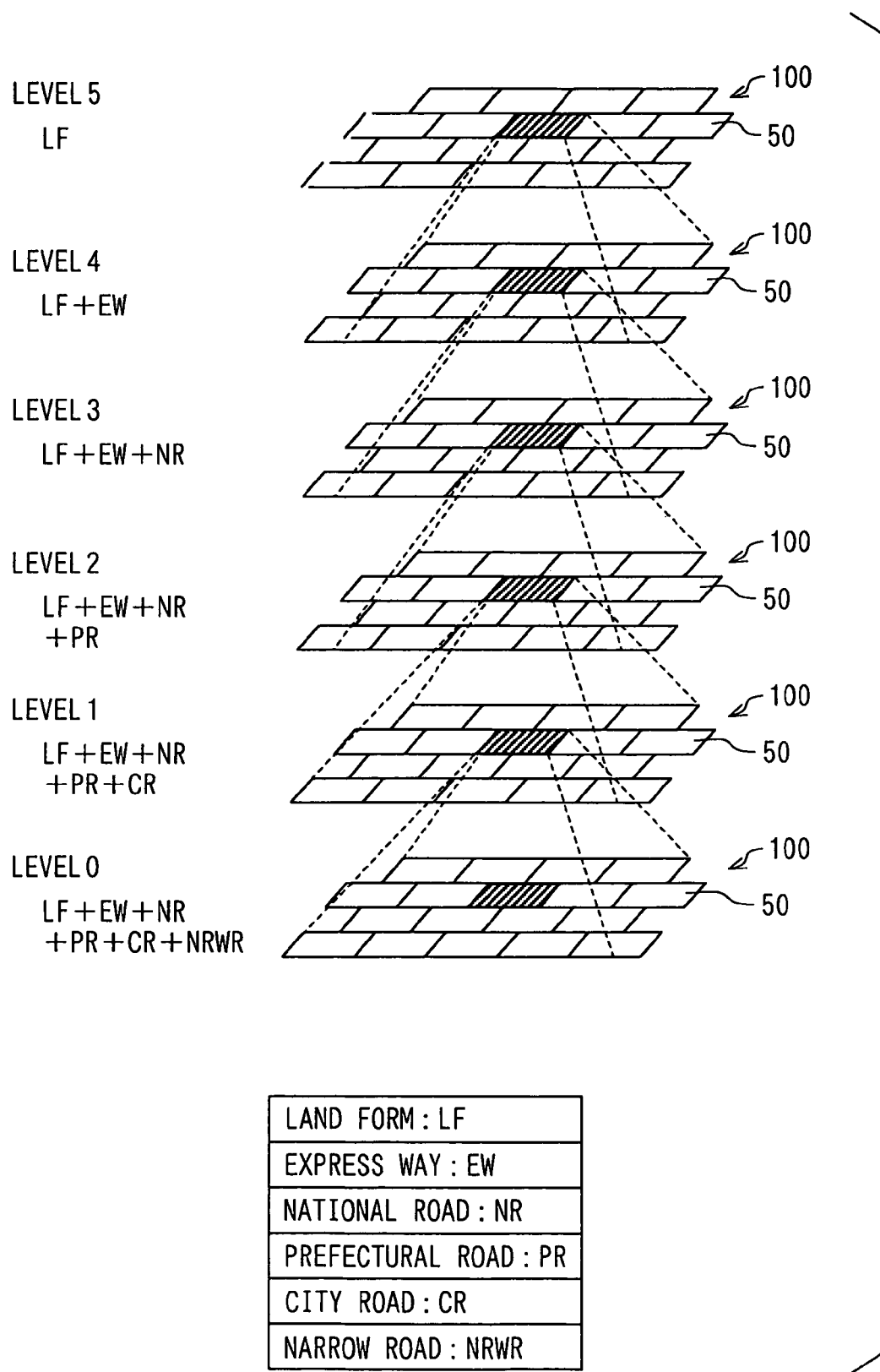
FIG. 2 is a diagram showing a hierarchical structure of map data.

The following will explain a hierarchical structure of map data. As shown in FIG. 2, the map data 100 are formed by levels from Level 5 to Level 0 having individual detail degrees. Level 5 includes regional map data 50 whose covering areas are the largest on the map, i.e., values of x1 and y1 are largest. The level 5 only includes land form data. Level 4 includes regional map data 50 whose covering areas are the second largest next to those of Level 5, including land form data and expressway road data. Level 3 includes regional map data 50 whose covering areas are the third largest next to those of Level 4, including land form data, expressway data, and national road data. Level 2 includes regional map data 50 whose covering areas are the fourth largest next to those of Level 3, including land form data, expressway data, national road data, and a prefectural road data. Level 1 includes regional map data 50 whose covering areas are the fifth larges next to those of Level 2, including land form data, expressway road data, national road data, prefectural road data, and city road data. Level 0 includes regional map data 50 whose covering areas are the sixth largest next to those of Level 1, including land form data, expressway road data, prefectural road data, city road data, and narrow road data. That is, Level 5 stores data covering the largest area, while Level 0 stores data covering the finest data.

The road data in the map data constitutes a map by connecting multiple nodes such as intersections using links. The road data includes link information with respect to each link. The link information includes a unique number (link ID) identifying a link, a link length representing a length of the link, x coordinates and y coordinates of starting and ending points of the link, a road width of the link, a road kind representing road information such as a toll road, and a road ID identifying a road including the link. The map data further stores place name information, traffic information, and facility information along with their coordinates (x coordinate and y coordinate). The land form data can include, for instance, image data.

Facility Data

The facility data represent facilities that are able to be displayed on a map and include facility kinds, additional information, facility names, coordinates of longitude and latitude, or the like. The facility kinds include: a facility including buildings and a relatively large area such as an airport, a golf course, or a park; a facility having a large building such as a hotel, a hospital, a city hall, or a library; and a facility having a relatively small building such as a convenience store, a gas station, or a parking structure.

(Explanation of Operation of Car Navigation System)

In this car navigation system 1, when a DVD video disk is reproduced in the DVD player 28, the DVD video disk needs to be substituted for the map disk and be set. Therefore, during reproducing of the DVD video disk, the DVD player 28 is exclusively used for reproducing the video. An operation to deal with this issue will be explained below.

Figure 3A:
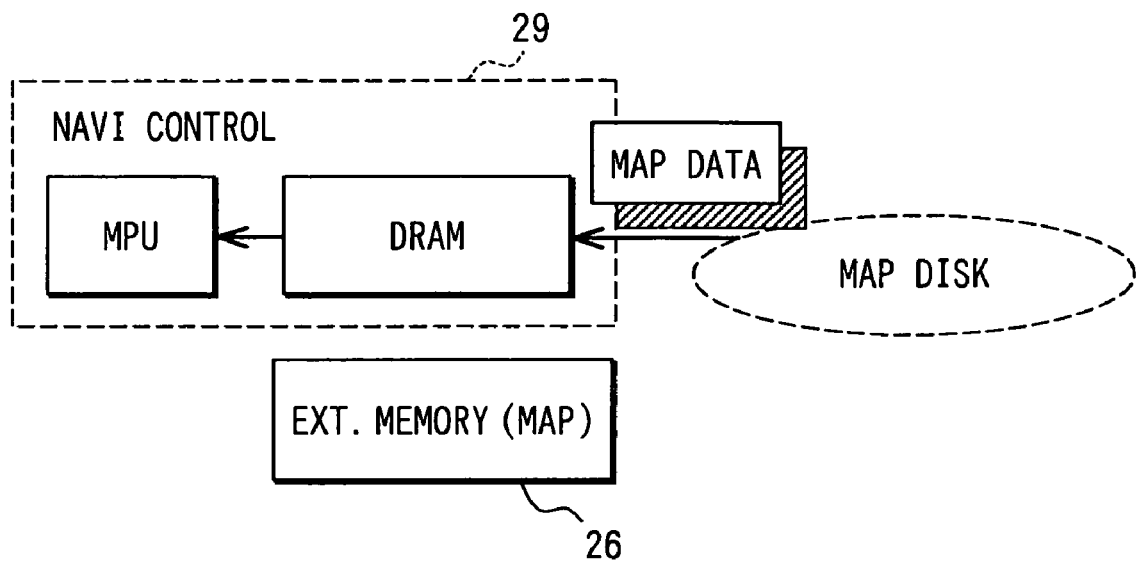
FIG. 3A is a diagram explaining a corridor operation with a map disk.
Figure 3B:
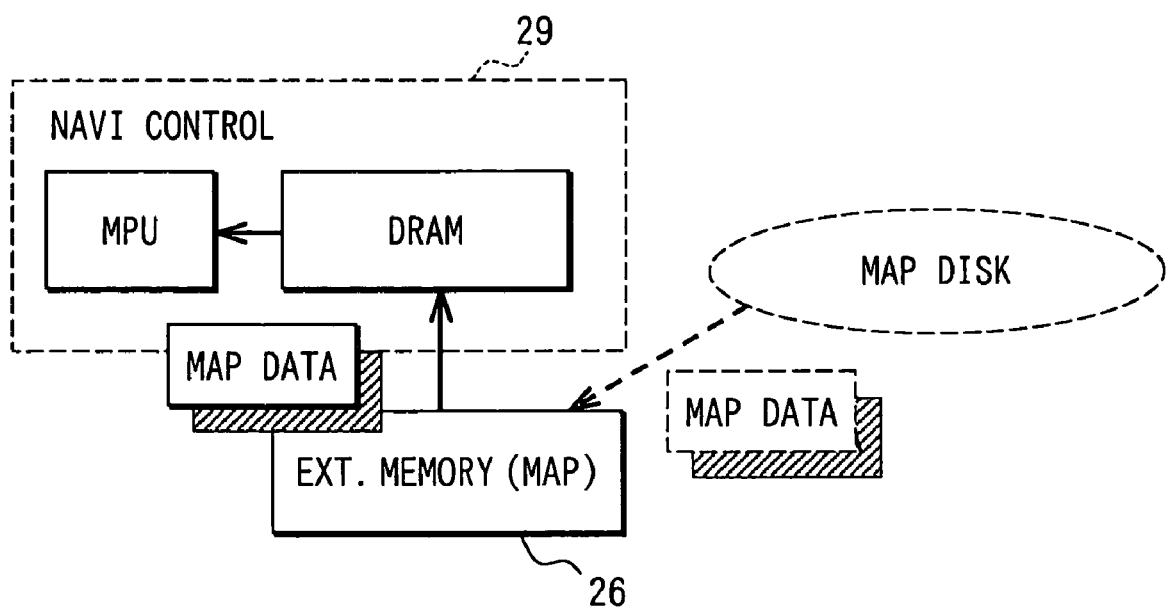
FIG. 3B is a diagram explaining a corridor operation without a map disk.

As shown in FIG. 3A, when the map disk is set in the DVD player 28, the navigation control circuit 29 conducts map display, guiding route setting, or route guiding based on the map data read out from the map disk. However, when the map disk is not set in the DVD player 28, the navigation control circuit 29 cannot read map data from the map disk. Therefore, as shown in FIG. 3B, before the map disk is removed from the DVD player 28, a given range of map data is read out and temporarily stored in the external memory 26 for map data. Therefore, the navigation control circuit 29 can conduct the map display, the guiding route setting, or the route guiding based on the map data read out from the external memory 26 for map data. This operation is referred to as a corridor operation.

However, because of a memory volume limit of the external memory 26 for map data, it is difficult to temporarily store large data. In a case that a map display range or a route searching range exceeds the stored given range of the map data, the map display or the route searching cannot be continued as long as no countermeasures take place. To continue the map display or the like, the map disk is re-set in the DVD player 28 and then necessary map data needs to be read out from the map disk.

In this case, a user needs to remove a disk and set the map disk. When the user is a driver, it is unsafe and unfavorable that the driver conducts such the operation during driving the vehicle. The driver therefore needs to stop the vehicle to conduct the operation; however, a proper place where the vehicle stops properly is not always present during driving of the vehicle. Thus, while the driver is searching for the place to stop, the vehicle may exit from the stored given range of the map data, which disables even displaying the current position. To deal with this issue, the car navigation system 1 of this embodiment performs as follows. Route guiding is conducted to designate as a temporary destination a stoppable place where the vehicle is able to stop and that is located along the route to the final destination and also as close as possible to a peripheral boundary of the given range of the map data.

(Clipping-Out of Map Data)

Figure 4A:
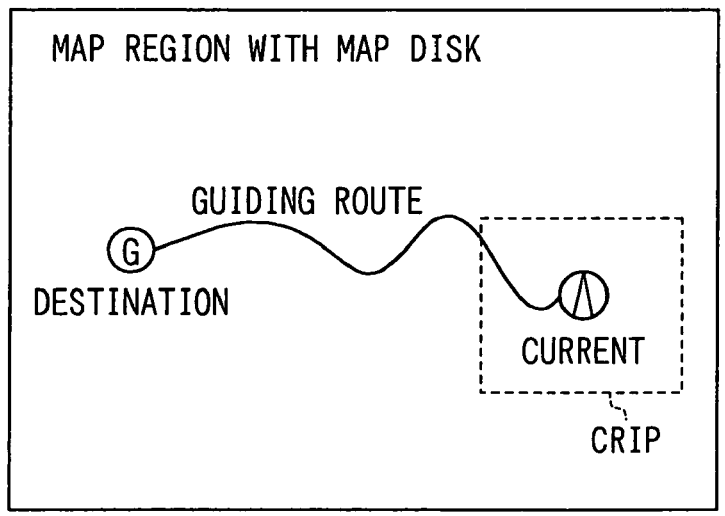
FIGS. 4A to 4C are diagrams explaining map-data clipping-out and a search for a stoppable place.

The external memory 26 for map data cannot secure a memory volume equivalent to a map disk with respect to a map range that is able to be displayed when the map disk is set in the DVD player 28. As shown in FIG. 4A, a portion of map data therefore needs to be clipped out in accordance with the memory volume of the external memory 26. Here, since the map data has a hierarchical structure as shown in FIG. 2, the detail map data is clipped out in consideration of both capability of route guiding and relative relationships between wide-range meshes and detail range meshes (detail range meshes depend from a superordinate mesh).

(Setting Destination for Data Interchange)

Figure 4B:
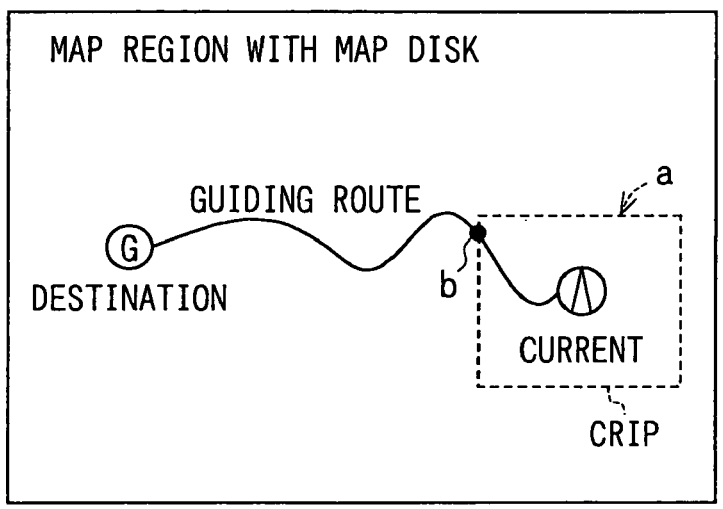

In FIG. 4B, a dotted-line frame a is defined as a peripheral boundary of a map region that is able to be clipped out to the external memory 26 for map data. In this embodiment, it is designed that a rectangular region based on the current position is clipped out by operation of a user. Since the route guiding cannot be possible without detail map data, simply removing the map disk under a state shown in FIG. 4B results in disappearance of the guiding route. Further, only the map data clipped out to the external memory 26 does not enable search for a guiding route to the destination. Therefore, the following cross point b is retrieved. This cross point b is a cross point between route information retrieved while the map disk is set in the DVD player 28 and the boundary a of the map data clipped out to the external memory 26. This boundary a in FIG. 4B is enlarged and shown in FIG. 4C. Again, the region surrounded by the boundary a is a map region that is able to be clipped out to the external memory 26.

Figure 4C:
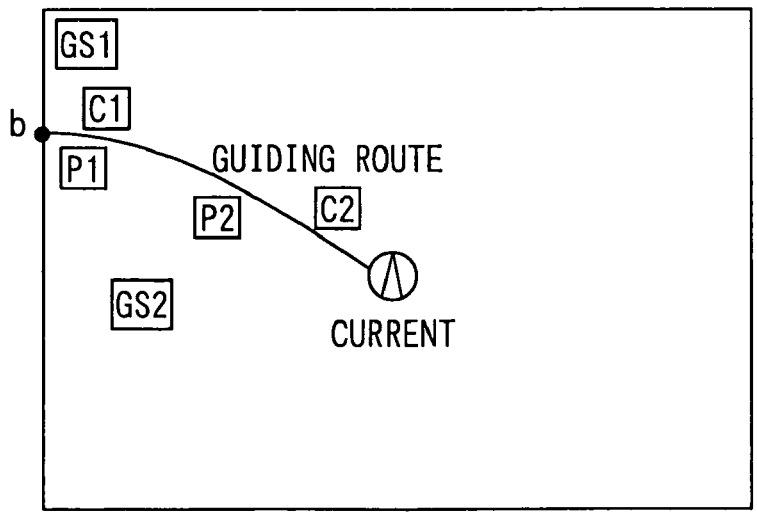

Then, "a place (or facility) that is located close to the boundary of the map range clipped out and where the vehicle is able to stop for user's operation" is retrieved and stored. In FIG. 4C, facilities along the route are searched for as "a place where the vehicle is able to stop for user's operation." Here, "a place where the vehicle is able to stop for user's operation" is defined as "a facility having a parking lot," so search is conducted with convenience stores, gas stations, or parking structures regarded as a search object. In FIG. 4, a gas station GS1 and a gas station GS2 that are not located along the route are excluded from the search object. As a result, facilities along the route become a parking structure P1, a parking structure P2, a convenience store C1, and a convenience store C2. These facilities are then sorted in an order closer to the cross point b.

Here, when two facilities have distances from the cross point b equal to each other, one of the two facilities that is located on the left side of the road in the route is prioritized than the other. Therefore, weighting computation is performed depending on how far from the crossing point b and on which of the left side or the right side a facility is located. For instance, when the relevant road has a center divider, the vehicle cannot enter the opposite lane, which results in a roundabout approach. Even without the center divider, but with heavy traffic, the vehicle cannot easily cross over the opposite lane to reach the relevant facility. Therefore, a facility located on the left side of the route (or a facility directly facing an advancing lane of the vehicle without crossing over an opposite lane) is prioritized. Here, this explanation is based on a left-hand traffic in Japan. Therefore, in a region adopting a right-hand traffic (e.g., in the United States of America), a facility located on the right side of the route is naturally prioritized.

As the result of sorting, a priority order becomes the parking structure P1→the convenience store C1→the parking structure P2→the convenience store C2, so that the parking structure P1 is set as a destination during the corridor operation (or a temporary destination).

Figure 5:
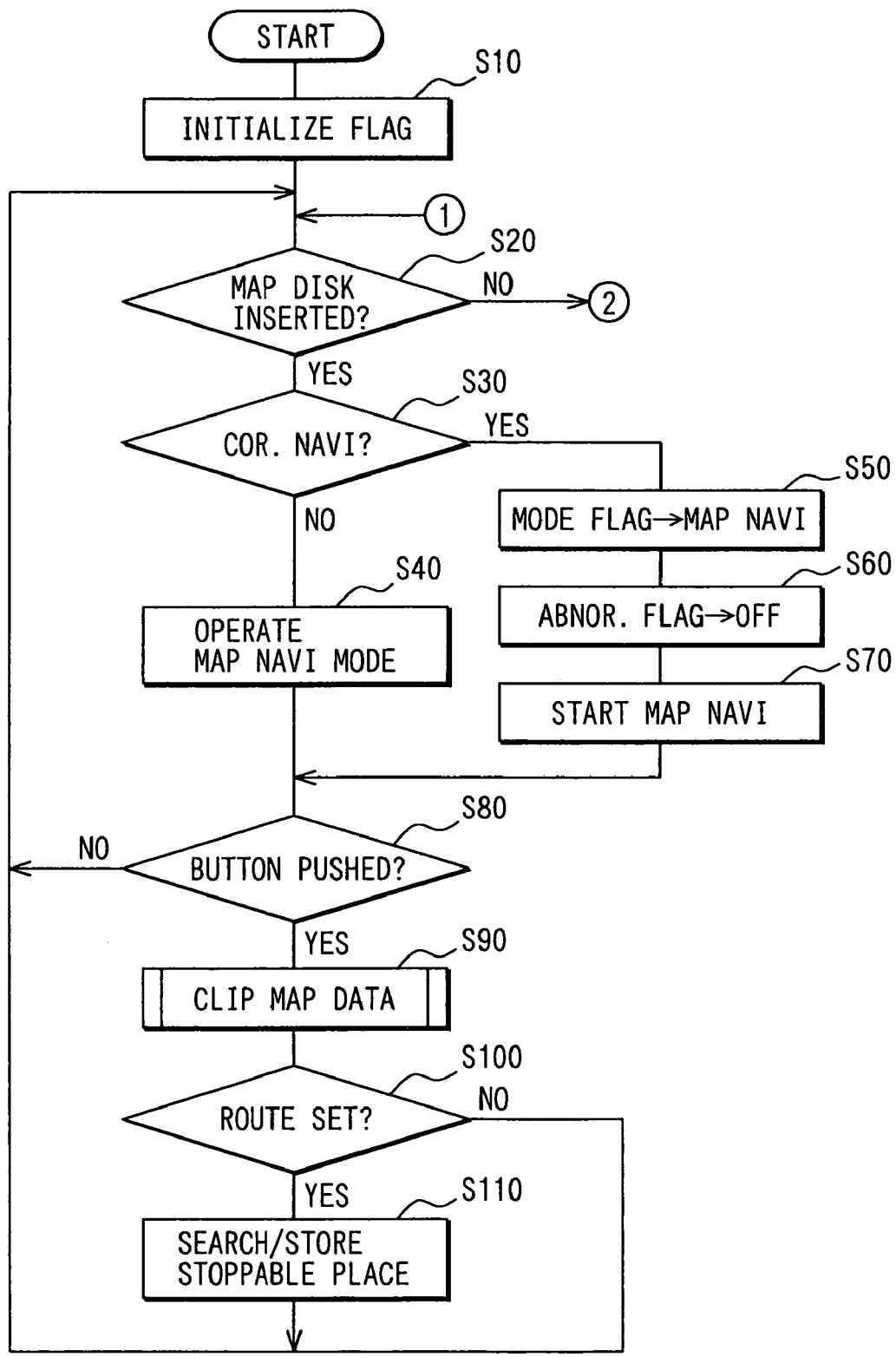
FIG. 5 is a flowchart diagram of the first part of a process executed by a navigation control circuit.
Figure 6:
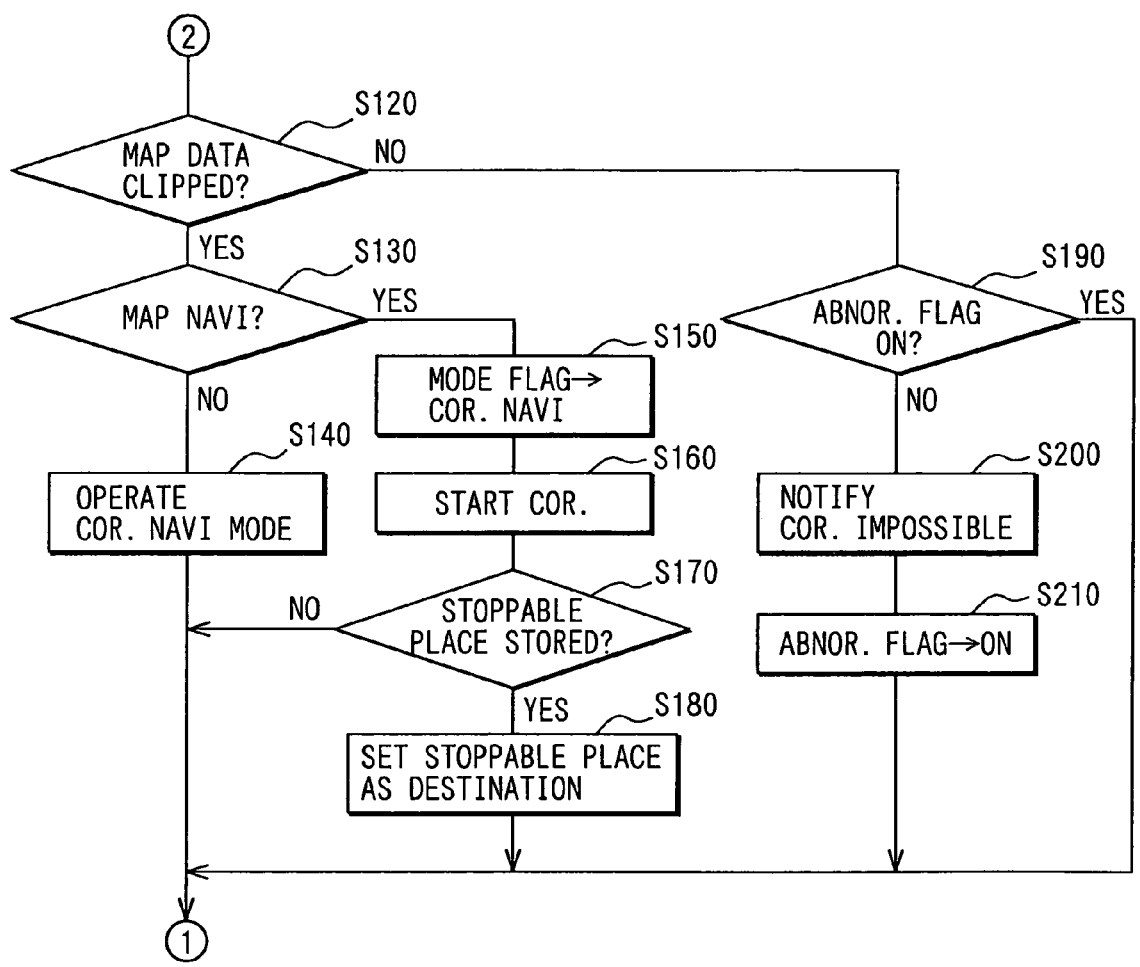
FIG. 6 is a flowchart diagram of the second part of a process executed by a navigation control circuit.

Next, a process executed by the navigation control circuit 29 will be explained with reference to FIGS. 5, 6. This process aims at achieving the above-described operation.

At Step S10 after starting the process, flag initialization is conducted. In detail, the following takes place: Operating Mode Flag→Map Navigation; Corridor Operation Abnormality Notice Flag→Off; and Map Data Input Source→Map Disk.

At Step S20, it is determined whether a map disk is inserted in the DVD player 28. When a map disk is inserted (S20: YES), the sequence goes to Step S30. In contrast, when a map disk is not inserted (S20: NO), the sequence goes to S120 in FIG. 6. Here, when the determination at Step S20 is negated, a DVD video disk or another disk excluding the map disk is inserted in the DVD player 28 or no disk is inserted in the DVD player 28.

At Step S30, it is determined whether Operating Mode Flag is set to Corridor Navigation. When it is not set to Corridor Navigation, the sequence goes to Step S40, where a map navigation mode is used for operation (i.e., route guiding or map display). In contrast, when it is set to Corridor Navigation (S30: YES), Operating Mode Flag is set to Map Navigation (Step S50) and Corridor Operation Abnormality Notice Flag is set to Off (S60). Then, Map Data Input Source is switched from External Memory to Map Disk to start a map navigation operation (Step S70).

After the process at Steps S40, S70, the sequence goes to Step S80, where it is determined whether a map data reading button is pushed in either the operation switch group 22 or the remote controller 23a. When this button is not pushed (S80: NO), the sequence returns to Step S20. When this button is pushed (S80: YES), the sequence goes to Step S90.

Here, map data is clipped out from the map disk in accordance with the memory volume of the external memory 26.

Then, at Step S100, it is determined whether a guiding route is set. When a guiding route is not set (S100: NO), the sequence directly returns to Step S20. When a guiding route is set (S100: YES), the sequence goes to Step S110 and then returns to Step S20. At Step S110, a stoppable place (or facility) where the vehicle is able to stop is retrieved and then stored. This stoppable place is along the guiding route and also close to the boundary of the clipped map range.

Initially, when the map disk is not inserted in the DVD player 28 or the map disk that has been inserted is removed from the DVD player 28, the determination at Step S20 is negated. The sequence thereby goes to Step S120 in FIG. 6.

At Step S120, it is determined whether map data is clipped out to the external memory 26. When map data is clipped (S120: YES), the sequence goes to Step S130. Here, it is determined whether Operating Mode Flag is set to Map Navigation. When Operation Mode Flag is not set to Map Navigation (S130: NO), the sequence goes to Step S140. Here, route guiding or map display takes place in a corridor navigation mode. In other words, route guiding or map display is executed by using the map data clipped out to the external memory 26. After the process at Step S140, the sequence returns to Step S20.

In contrast, when Operation Mode Flag is set to Map Navigation (S130: YES), the sequence goes to Step S150. Here, Operating Mode Flag is set to Corridor Navigation and Map Data Input Source is switched from Map Disk to External Memory to start the corridor operation (S160). At Step S170, it is then determined whether a stoppable place (or facility) where the vehicle is able to stop is stored. This stoppable place is along the guiding route and also close to the peripheral boundary of the clipped map range. When a stoppable place is not stored (S170: NO), the sequence directly returns to Step S20 in FIG. 5. When a stoppable place is stored (S170: YES), the sequence goes to Step S180. Here, the stoppable place is set to a destination and the sequence returns to Step S20 in FIG. 5. Route guiding to thus set destination is executed at Step S140.

In contrast, when map data is not clipped out to the external memory 26 (S120: NO), the sequence goes to Step S190. Here, it is determined whether Corridor Operation Abnormality Notice Flag is set to ON. When Corridor Operation Abnormality Notice Flag is set to ON (S190: YES), the sequence directly returns to Step S20 in FIG. 5. When Corridor Operation Abnormality Notice Flag is set to OFF (S190: NO), the sequence goes to Steps S200, S210 and then returns to Step S20 in FIG. 5. At Step S200, it is notified via the display unit 27 that the corridor operation is impossible because of lack of the map data stored in the external memory 26. Here, it can be otherwise notified via the speaker 47 using voices. At next Step S210, Corridor Operation Abnormality Flag is set to ON.

As explained above, in the car navigation system 1 of the embodiment, before the map disk is removed from the DVD player 28, a given range of map data is read out and temporarily stored in the external memory 26 for map data. The navigation control circuit 29 conducts map display, guiding route setting, or route guiding based on the map data read out from the external memory 26. When such the corridor operation is conducted, a temporary destination is set to a stoppable place before removing the map disk and route guiding is conducted using the temporary destination. The stoppable place is a place that is located along the route to the destination and as close as possible to the peripheral boundary of the stored map range of the map data and where the vehicle is able to stop. Therefore, stopping the vehicle at the stoppable place enables safely re-setting of the map disk to the DVD player 28, which helps prevent the usability of the corridor operation from deteriorating.

OTHER EMBODIMENTS (1) In the above embodiment, setting a guiding route is one of the presuppositions, so the stoppable place can be designated. However, when the guiding route is not set, this method cannot be adopted. When a guiding route is not set, the navigation control system can conduct the following. For instance, when a vehicle approaches within a given distance from the boundary of the stored range of the map data, a stoppable place where the vehicle is able to stop is notified to a user via the display unit 27 or the like. This stoppable place is a place (or facility) that is located between a current position and the boundary of the given range of the map data. In this case, the stoppable place is supposed to be designated in consideration of an advancing direction or an advancing lane of the vehicle. For instance, a stoppable place is located along a route or a road that the vehicle will travel in following the currently-traveling road and preferably as close as possible to the boundary of the given map range of the map data clipped out. However, in this case, there is a possibility of absence of a proper stoppable place along the road following the currently-advancing road, so another stoppable place excluding the stoppable place along the road following the currently-advancing road can be designated.

(2) In the above embodiment, as shown in FIG. 1, a CD player 42 is provided in the AV system 2. However, the CD player 42 can be omitted in a case that the DVD player 28 is used for all of a map disk, a video DVD, and a music CD, either of which is inserted to the DVD player 28.

(3) The function of the navigation control circuit 29 of the car navigation system 1 can be achieved as a program that is executed by a computer. This program can be stored in a computer-readable medium such as a flexible disk, a magneto optical disk, a CD-ROM, a hard disk, a ROM, or a RAM. The program can be arbitrarily loaded to the computer or downloaded via a network, so that the function can be achieved.

It will be obvious to those skilled in the art that various changes may be made in the above-described embodiments of the present invention. However, the scope of the present invention should be determined by the following claims.

What is claimed is:

1. A car navigation system provided in a vehicle, the system comprising:
   a current position designating unit configured to designate a current position of the vehicle;
   a route guiding unit configured to indicate a guiding route to a destination;
   a disk reproducing unit that is able to read and reproduce data from one of (i) a first disk storing map data covering a predetermined map range including the guiding route to the destination and (ii) a second disk storing data other than the map data, wherein the first disk and the second disk are interchangeable in the disk reproducing unit;
   a storing unit that stores a portion of the map data partially read out from the first disk via the disk reproducing unit based on the current position, the portion of the map data corresponding to a given partial range included in the predetermined map range, the given partial range not including the destination while covering a partial route included within the guiding route up to a peripheral boundary of the given partial range without reaching the destination; and a controlling unit configured to cause a display unit to display a map
based on map data read out from the first disk when the first disk is reproduced by the disk reproducing unit or
based on the portion of the map data, which is corresponding to the given partial range and stored in the storing unit when the second disk is reproduced by the disk reproducing unit;
wherein, when the controlling unit causes the display unit to display a map based on the portion of the map data, the controlling unit causes the route guiding unit to indicate a route to a temporary destination that is as close as possible to the peripheral boundary of the given partial range of the map data along the guiding route to the destination and is a stoppable place where the vehicle is able to stop.

2. The navigation system of claim 1,
wherein the map data includes facility data that indicate facilities, and
wherein a facility that is supposed to have a parking place is designated based on the facility data when the stoppable place is determined.

3. The navigation system of claim 2,
wherein at least two of the facilities are considered when the stoppable place is determined, wherein a first of the two is a distance from the peripheral boundary along the guiding route to the destination and a second of the two is an advancing lane or an opposite lane of a facility which the vehicle faces.

4. The navigation system of claim 1, further comprising:
an accepting unit that accepts an instruction of a user,
wherein, when the controlling unit accepts an instruction of temporarily storing map data via the accepting unit,
the controlling unit causes the storing unit to store the given partial range of the map data that is partially read out from the first disk that is reproduced.

5. The navigation system of claim 4,
wherein, when the controlling unit accepts the instruction of temporarily storing map data via the accepting unit,
the controlling unit causes the storing unit to store the given partial range of the map data that is partially read out from the first disk, based on the current position.

6. The navigation system of claim 1, further comprising:
a notifying unit that notifies a user,
wherein, when no map data is stored in the storing unit, the controlling unit causes the notifying unit to notify the user of information that no map data is stored in the storing unit.

7. The navigation system of claim 1, wherein
stopping the vehicle at the temporary destination allows reading a certain portion of the map data from the first disk, which is to be switched from the second disk in the disk reproducing unit, the certain portion of the map data covering a route towards the destination from the temporary destination.

8. The navigation system of claim 1, wherein
the stoppable place is where the vehicle can park.

9. The navigation system of claim 1,
wherein, when the controlling unit causes the route guiding unit to indicate the route to the temporary destination, the storing unit further does not store map data which is not read out from the first disk and which includes the guiding route beyond the peripheral boundary of the given partial range.

10. A car navigation system provided in a vehicle, the system comprising:
a current position designating unit configured to designate a current position of the vehicle;
a disk reproducing unit that is able to read and reproduce data from one of a first disk storing map data covering a predetermined map range including a guiding route to a final destination and a second disk storing data other than the map data, wherein the first disk and the second disk are interchangeable in the disk reproducing unit;
a storing unit that stores a portion of the map data partially read out from the first disk via the disk reproducing unit based on the current position, the portion of the map data corresponding to a given partial range included in the predetermined map range, the given partial range covering a route to reach a peripheral boundary of the given partial range;
a controlling unit configured to cause a display unit to display a map
based on map data read out from the first disk when the first disk is reproduced by the disk reproducing unit or
based on the portion of the map data, which is corresponding to the given partial range and stored in the storing unit when the second disk is reproduced by the disk reproducing unit;
a notifying unit that notifies a user,
wherein, in a case that the controlling unit causes the display unit to display a map based on the portion of the map data stored in the storing unit,
the controlling unit causes the notifying unit to notify a place where the vehicle is able to stop and that is located from the current position to the peripheral boundary of the given partial range, when the vehicle approaches the peripheral boundary within a given distance.

11. The navigation system of claim 10, wherein
stopping the vehicle at the notified place allows reading a certain portion of the map data from the first disk, which is to be switched from the second disk in the disk reproducing unit, the certain portion of the map data covering a route outward of the peripheral boundary of the given partial range.

12. The navigation system of claim 10, wherein
the place where the vehicle is able to stop is where the vehicle can park.

13. The navigation system of claim 10,
wherein, when the controlling unit causes the notifying unit to notify the place, the storing unit further does not store map data which is not read out from the first disk and which includes the guiding route beyond the peripheral boundary of the given partial range.

14. A computer program product in a computer-readable medium for use in a oar navigation system provided in a vehicle, the car navigation system including
a current position designating unit configured to designate a current position of the vehicle;
a disk reproducing unit that is able to read and reproduce data from one of (i) a first disk storing map data covering a predetermined map range including the guiding route to a final destination, and (ii) a second disk storing data other than the map data, wherein the first disk and the second disk are interchangeable in the disk reproducing unit; and a storing unit that stores a portion of the map data partially read out from the first disk via the disk reproducing unit based on the current position, the portion of the map data corresponding to a given partial range included in the predetermined map range, the given partial range not including the destination while covering a partial route included within the guiding route up to a peripheral boundary of the given partial range without reaching the destination;

the computer program product comprising:

instructions for causing a display unit to display a map
- based on map data read out from the first disk when the first disk is reproduced by the disk reproducing unit or
- based on the portion of the map data, which is corresponding to the given partial range and stored in the storing unit when the second disk is reproduced by the disk reproducing unit; and instructions for indicating a route to a temporary destination that is a stoppable place where the vehicle is able to stop when the display unit is caused to display a map based on the portion of the map data, wherein the temporary destination is as close as possible to the peripheral boundary of the given partial range of the map data along the guiding route to the final destination.

15. A computer program product in a computer-readable medium for use in a car navigation system provided in a vehicle, the car navigation system including a current position designating unit configured to designate a current position of the vehicle;

a disk reproducing unit that is able to read and reproduce data from one of a first disk storing map data covering a predetermined map range including a guiding route to a final destination and a second disk storing data other than the map data, wherein the first disk and the second disk are interchangeable in the disk reproducing unit; and a storing unit that stores a portion of the map data partially read out from the first disk via the disk reproducing unit based on the current position, the portion of the map data corresponding to a given partial range included in the predetermined map range, the given partial range covering a route to reach a peripheral boundary of the given partial range;

the computer program product comprising:

instructions for causing a display unit to display a map
- based on map data read out from the first disk when the first disk is reproduced by the disk reproducing unit or
- based on the portion of the map data, which is corresponding to the given partial range and stored in the storing unit when the second disk is reproduced by the disk reproducing unit; and instructions for notifying a user of a stoppable place where the vehicle is able to stop when the vehicle approaches the peripheral boundary of the given partial range within a given distance, in a case that the display unit is caused to display a map based on the portion of the map data, wherein the stoppable place is located from the current position to the peripheral boundary of the given partial range.

* * * * *